(No Model.) 3 Sheets—Sheet 3.
B. W. GRIST.
ADJUSTABLE SHAFT BEARING.
No. 486,401. Patented Nov. 15, 1892.
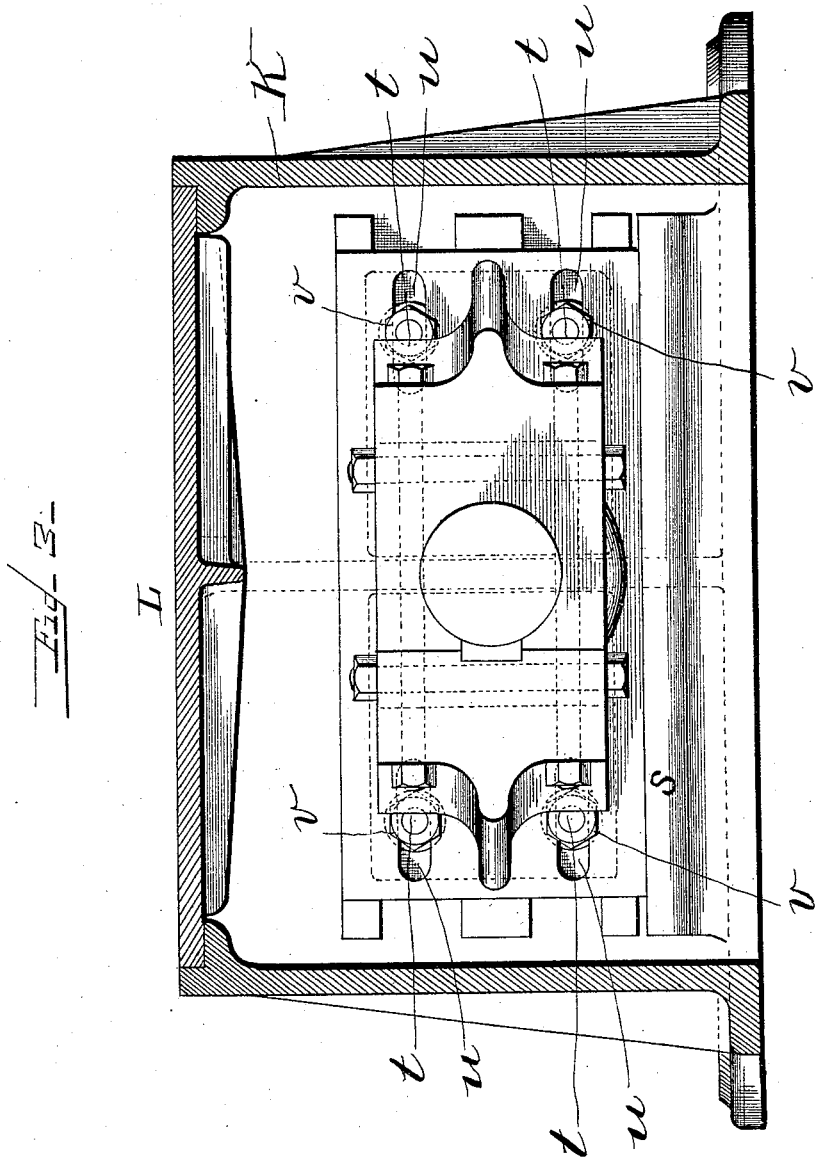
Witnesses
Inventor
Benjamin W. Grist
By D. L. Reinohl
Attorney

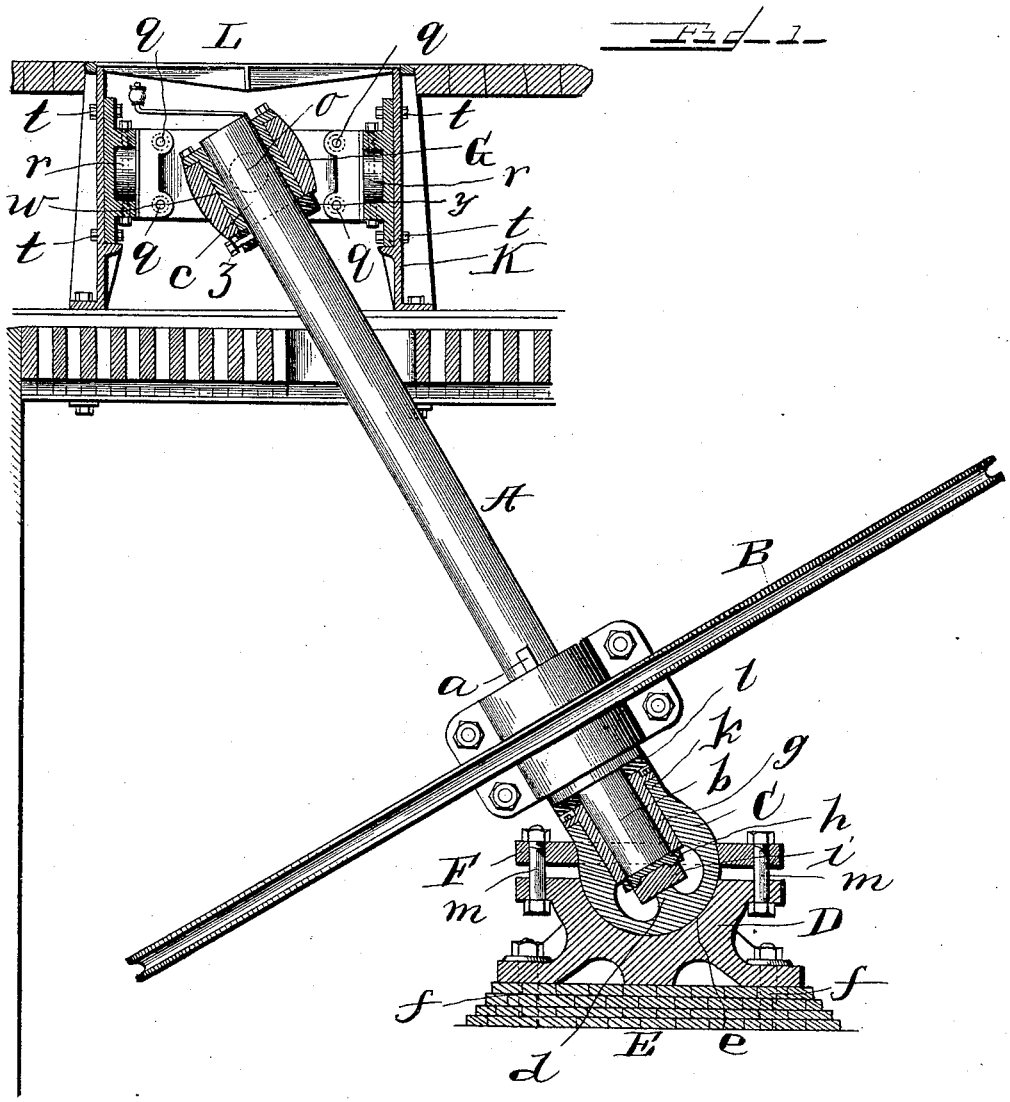

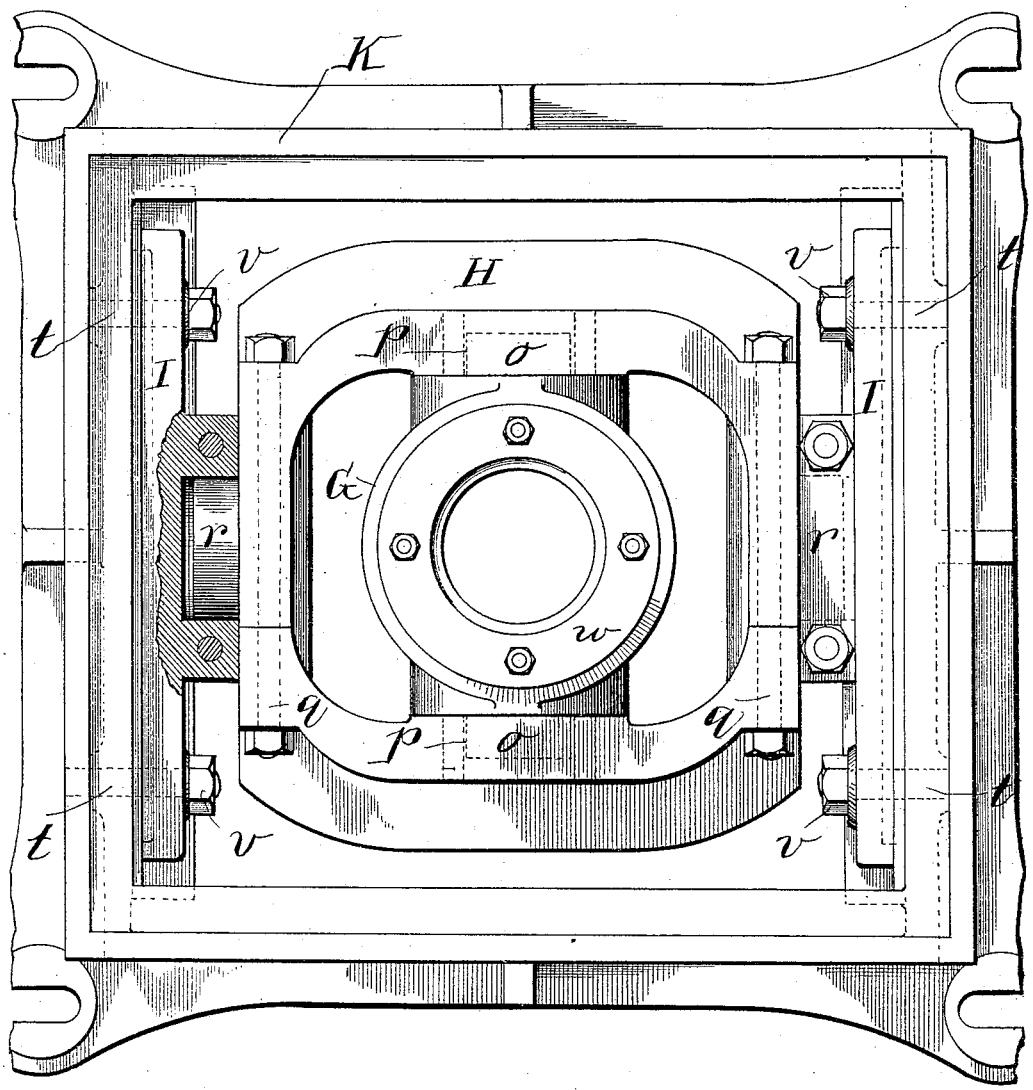

UNITED STATES PATENT OFFICE.

BENJAMIN W. GRIST, OF PHILADELPHIA, PENNSYLVANIA, ASSIGNOR TO THE PENNSYLVANIA IRON WORKS COMPANY, OF SAME PLACE.

ADJUSTABLE SHAFT-BEARING.

SPECIFICATION forming part of Letters Patent No. 486,401, dated November 15, 1892.

Application filed August 11, 1892. Serial No. 442,777. (No model.)

*To all whom it may concern:*

Be it known that I, BENJAMIN W. GRIST, a citizen of the United States, residing at Philadelphia, in the county of Philadelphia and State of Pennsylvania, have invented certain new and useful Improvements in Adjustable Shaft-Bearings; and I do hereby declare the following to be a full, clear, and exact description of the invention, such as will enable others skilled in the art to which it appertains to make and use the same.

My present invention relates to shaft-bearings for general use, in the present instance adapted to cable-railway purposes and applied to the shaft supporting the sheave for leading the cable from the power-drum at an angle to the conduit in a street.

The invention will be fully disclosed in the following specification and claims.

In the accompanying drawings, which form part of this specification, Figure 1 represents a side elevation, partly in section; Fig. 2, a top plan view of the upper bearing with the cover of containing-box removed; and Fig. 3, an end elevation, partly in section, of the same.

Reference being had to the drawings and the letters thereon, A indicates a shaft, on which is a sheave B, secured by a suitable spline or key $a$. The shaft is provided with a journal $b$ at the lower end and a journal $c$ at the upper end, the former resting in a spherical bearing C, having a central projection or step $d$ and supported in a base D, having a semispherical recess or seat $e$ in its upper end and resting in the present instance upon a foundation or pier E of masonry, to which it is properly secured by bolts $f f$, embedded in the masonry. The journal $b$ is surrounded by a sleeve $g$, of antifriction metal, preferably phosphor-bronze, and rests upon a disk $h$ of the same material, and below the disk $h$ is a step-plate $i$, of steel, and above the neck $k$ of the bearing plate C is an annular bearing-plate $l$, preferably of phosphor-bronze. The bearing C is secured to the base D by means of a clamping-plate F, which engages the outer surface of the bearing, and is adjustably secured to the base D by means of bolts $m$, engaging the flange $n$ on the base D. The upper journal $c$ of the shaft A engages a bearing G, provided with trunnions $o\ o$, which rest in seats $p\ p$ in a two-part yoke H, which admits of lateral oscillation of the upper end of the shaft A. The two parts of the yoke H are secured together by bolts $q\ q$, and said yoke is provided with trunnions $r\ r$, which are at right angles to the trunnions $o\ o$ and rest in seats in cheek-pieces I I, and admits of a lateral oscillation of the upper end of the shaft A at a right angle to the oscillation effected by the trunnions $o\ o$. The cheek-pieces are supported in a box or frame K, resting upon the lug $s$, of which there is one on each side of the frame K, and are adjustably secured by stud-bolts $t\ t$, which are fixed in the frame by screw-threads and extend through elongated slots $u\ u$ in the cheek-pieces I, and are provided with nuts $v\ v$ for securing the cheek-pieces, the yoke, and the upper bearing in proper relation to the lower bearing of the shaft to secure the angle for the sheave B to lead the cable to the sheave in a cable-conduit or such other place as it may be desired for use.

Within the bearing G and around the journal $c$ is a sleeve-bearing $w$, of antifriction metal, preferably of the kind hereinbefore designated, and below the bearing is a collar $y$, secured to the shaft by a set-screw $z$. The frame K is provided with a removable cover L to afford ready access to the parts therein contained for inspection and lubrication, and also for the renewal of the shaft A when worn out.

To remove the shaft A, the sheave B and collar $y$ are loosened on the shaft and the sleeve-bearing $w$ removed from G, when the shaft may be drawn through the bearing G and another inserted.

The lower shaft-bearing is placed in the vault and the box or frame containing the upper bearing sunk or embedded in the ground above the vault when used for conducting the cable of a railway from the power-drum to the cable-conduit in the road-bed.

In setting the sheave B the clamping-plate F in the lower bearing and the nuts $v\ v$ on the bolts $t\ t$ are slackened and the sheave adjusted to the proper angle of inclination required, the shaft A moving freely on the universal ball-bearing at its lower end and the yoke H and bearing G oscillating on their respective trunnions and moving with the cheek-pieces I as the upper end of the shaft is deflected, and when properly set the clamping-plate is secured by its bolts, which fixes the lower bearing, and the nuts $v\,v$ drawn up on the bolts $t\,t$ and the upper bearing permanently secured in fixed relation to the lower bearing.

By the construction shown the variations and exact lead required by cables can be readily and accurately secured and permanently maintained.

Having thus fully described my invention, what I claim is—

1. The combination of a sheave, a revoluble shaft having journals at both ends, an adjustable bearing at one end, a trunnioned bearing, and a trunnioned yoke supporting said latter bearing at the opposite end of the shaft and admitting of oscillations of the bearing and the yoke.

2. The combination of a sheave, a revoluble shaft having journals at both ends, a universal bearing at one end, a trunnioned bearing, and a trunnioned yoke at the opposite end of said shaft and supporting said latter bearing.

3. The combination of a sheave, a revoluble shaft having journals at both ends, a trunnioned bearing, a trunnioned and longitudinally-movable yoke supporting said bearing at one end, and an adjustable bearing at the opposite end of said shaft.

4. The combination of a sheave, a revoluble shaft having journals at both ends, a trunnioned bearing and a trunnioned yoke supporting said bearing at one end, a fixed frame supporting said yoke, and an adjustable bearing at the opposite end of the shaft.

5. The combination of a sheave, a revoluble shaft having journals at both ends, a trunnioned bearing and a trunnioned yoke supporting said bearing at one end, a fixed frame supporting said yoke, adjustable cheek-pieces between the yoke and the frame, and an adjustable bearing at the opposite end of the shaft.

6. The combination of a shaft provided with journals at both ends, a sheave secured to the shaft, a spherical bearing, a base for said bearing and a clamping-plate engaging the bearing, bolts for securing said plate and bearing to the base at one end, and a movable bearing at the opposite end of the shaft.

In testimony whereof I affix my signature in presence of two witnesses.

B. W. GRIST.

Witnesses:
 JAMES E. GRIST,
 EMANUEL NAGLÉ.